United States Patent [19]
Smith

[11] 3,790,881
[45] Feb. 5, 1974

[54] PULSE WIDTH SELECTOR
[75] Inventor: David K. Smith, Beltsville, Md.
[73] Assignee: The United States of America as represented by the Secretary of the Army, Washington, D.C.
[22] Filed: Mar. 6, 1973
[21] Appl. No.: 338,494

Related U.S. Application Data
[63] Continuation of Ser. No. 200,777, Nov. 22, 1971, abandoned.

[52] U.S. Cl.................. 328/112, 307/234, 328/111
[51] Int. Cl. ............................................. H03k 5/20
[58] Field of Search ............ 307/234; 328/111, 112; 324/181, 186

[56] References Cited
UNITED STATES PATENTS

| | | | |
|---|---|---|---|
| 3,247,491 | 4/1966 | Duvall............................ | 307/234 X |
| 3,122,647 | 2/1964 | Huey............................... | 307/234 X |
| 3,395,353 | 7/1968 | King................................ | 307/234 X |
| 3,593,162 | 7/1971 | Patmore........................... | 328/111 |
| 3,598,915 | 8/1971 | Mann et al....................... | 328/111 X |
| 3,601,706 | 8/1971 | Battle, Jr. et al. .............. | 328/112 X |
| 3,667,054 | 5/1972 | Nelson............................. | 307/234 X |
| 3,686,634 | 8/1972 | Malchman et al. .............. | 307/234 X |

OTHER PUBLICATIONS
"Pulse Duration Measurement" by McDowell in IBM Tech. Disclosure Bulletin, Vol. 11, No. 1, June 1968, pages 74–75.

*Primary Examiner*—Stanley D. Miller, Jr.

[57] ABSTRACT

An apparatus for accepting or rejecting pulses on the basis of pulse duration. Each pulse in an incoming pulse train is clocked into a first shift register, while a counter records the duration of the pulse. When the end of the pulse is recognized, the counter is checked to establish whether the pulse duration is within the predefined limits which have been established by the operator and set into the counting circuitry. If the pulse duration (width) is within the established limits, the pulse is shifted in parallel, out of the first shift register to a second shift register. If the pulse duration is outside the established limit, it is eliminated entirely (depending on the mode of operation). The first shift register is reset and is ready to receive the next pulse in the pulse train. The pulses in the second shift register are then shifted to an output line completing the selection process.

9 Claims, 4 Drawing Figures

INVENTOR
DAVID K. SMITH
BY
ATTORNEYS

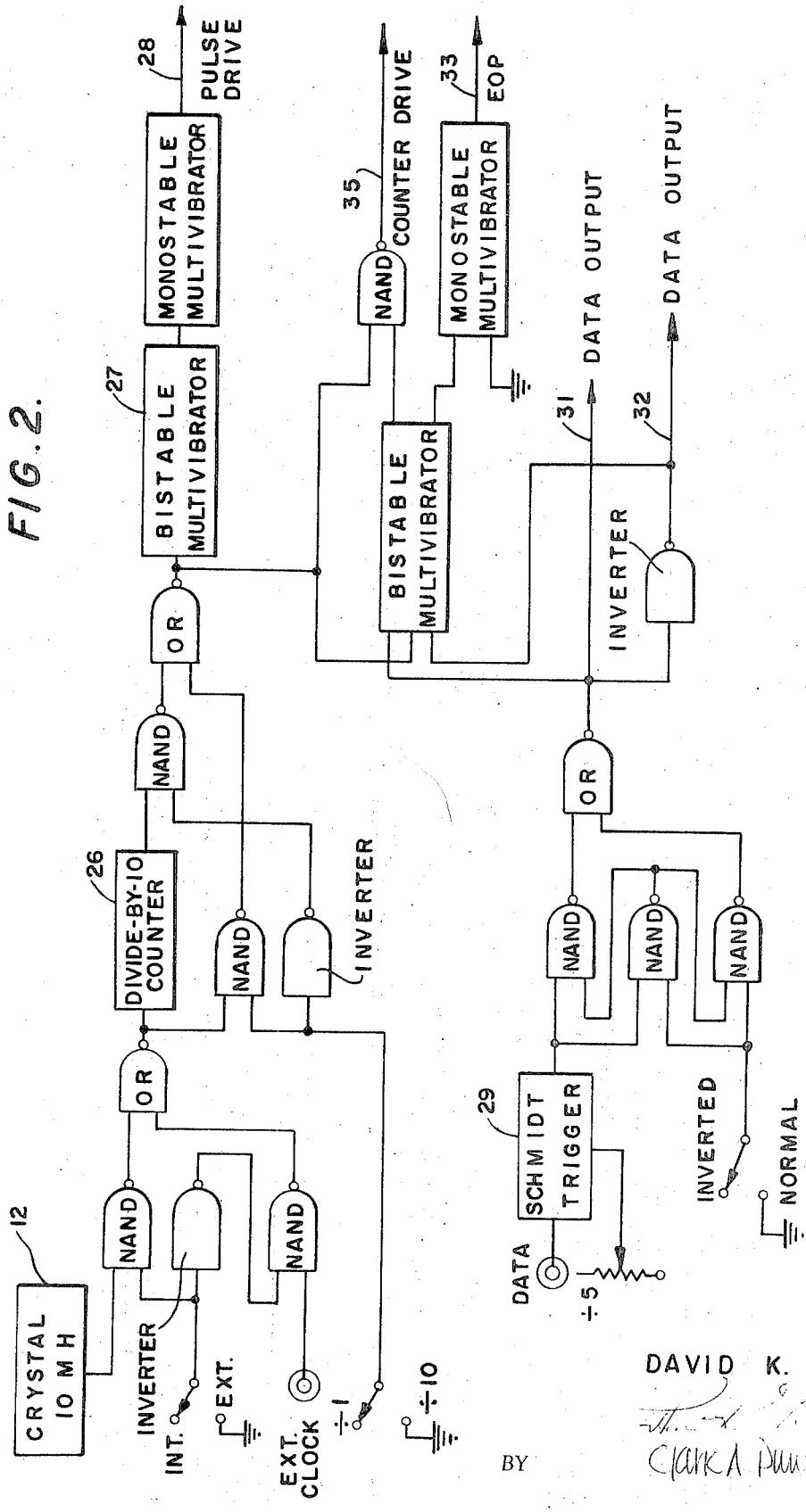

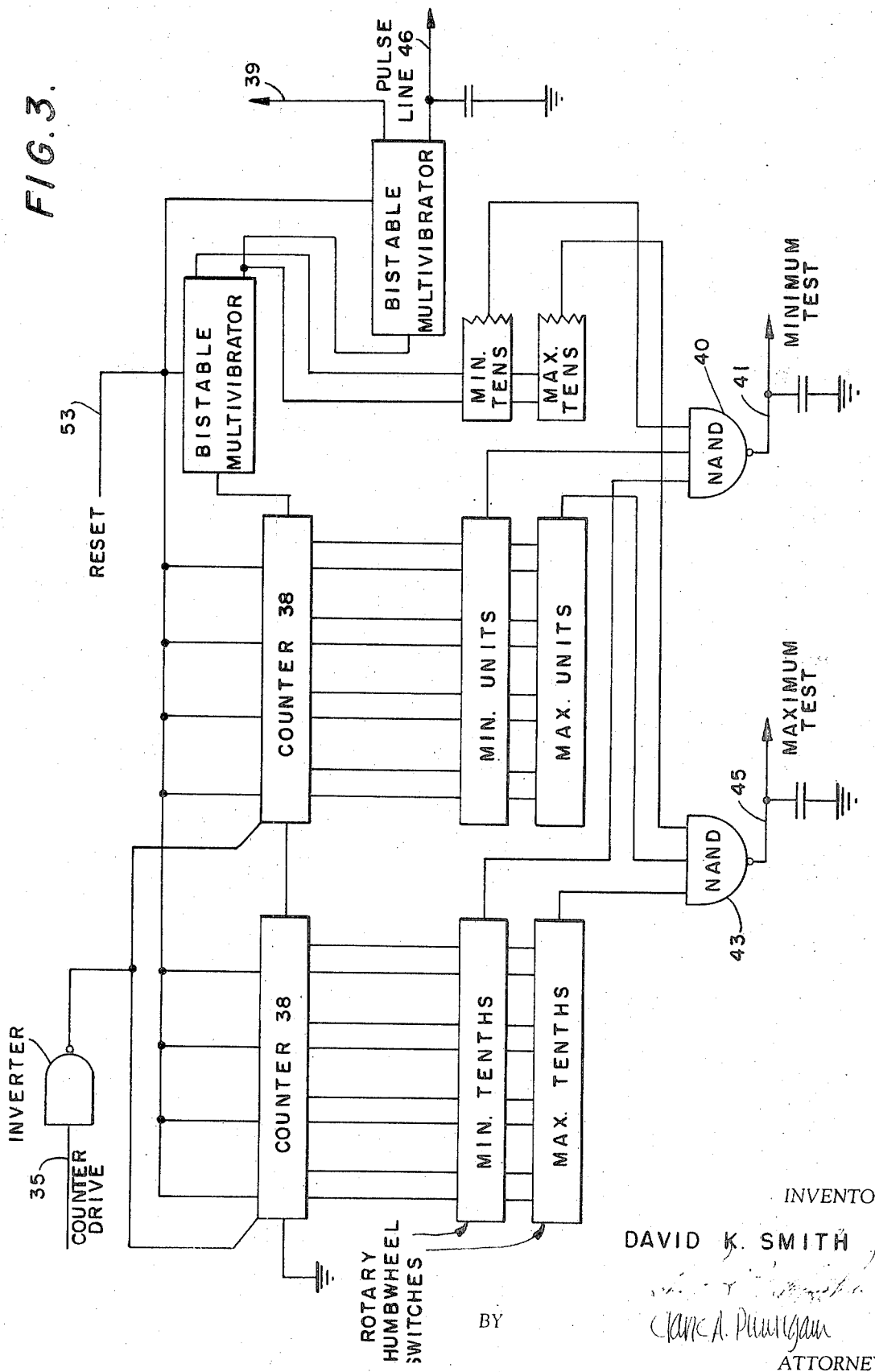

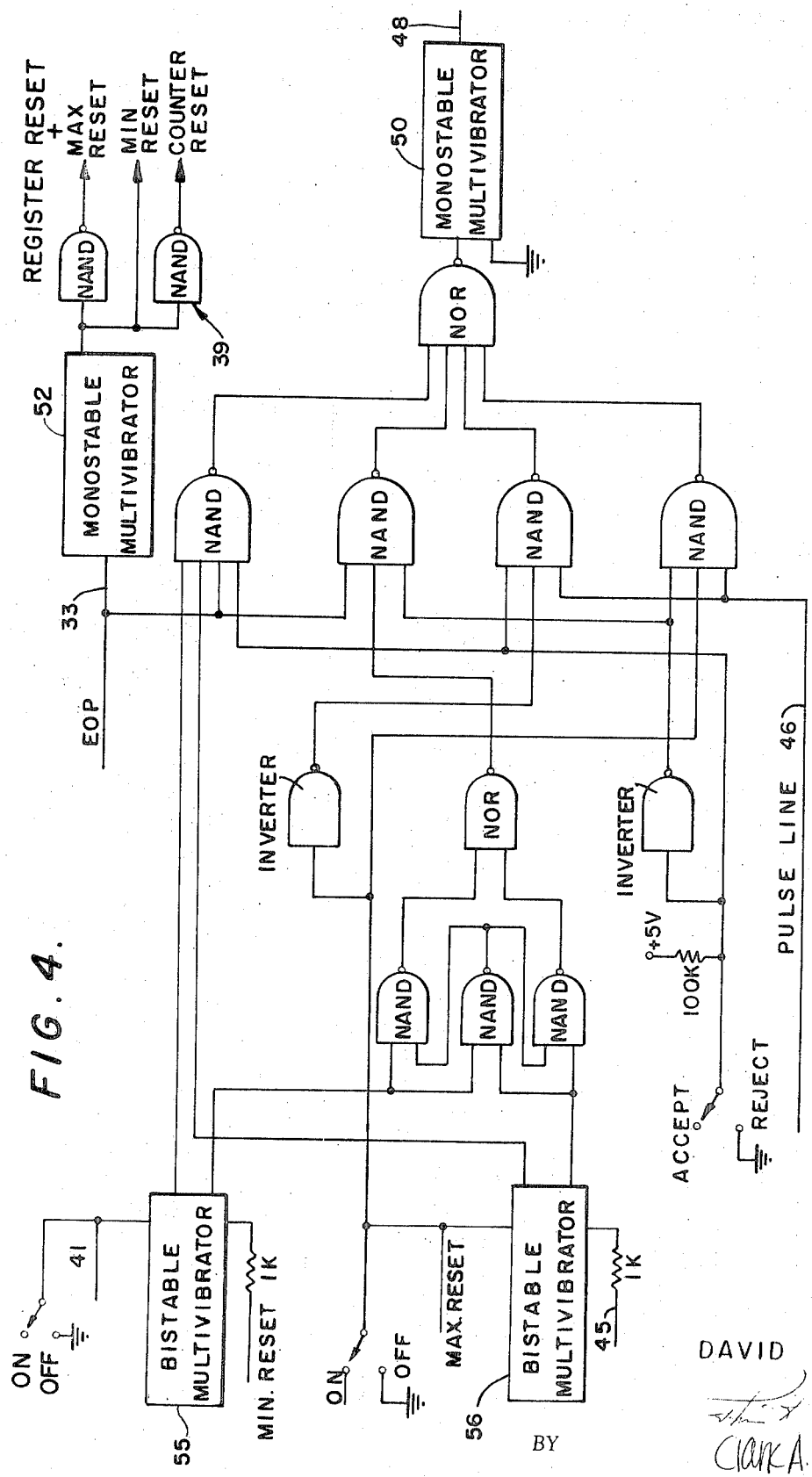

PULSE WIDTH SELECTOR

This is a continuation of application Ser. No. 200,777, filed Nov. 22, 1971, now abandoned.

BACKGROUND OF THE INVENTION

This invention relates generally to the field of rejecting or accepting certain pulses in a pseudo-random pulse series, and more specifically to rejecting or accepting pulses in such a pulse series on the basis of pulse width (duration).

In the area of digital electronics, and especially in those applications where a mixture of pulse sequences is present, it is often desirable to have the capability of selecting or rejecting certain defined pulses from that pulse mixture. The definition of the desired pulses might take the form of a particular repetition rate, a particular pulse width, or pulses having particular amplitude type information. Many different kinds of circuits have been developed to achieve this desired result of selecting or rejecting a certain class of pulses from a pulse train. It is also desirable to be able to vary the defined limits of the selection process quickly and easily, without changing any circuitry. Thus, a flexible system for accepting and rejecting pulses in a pulse train has been the subject of a great deal of study and invention in the prior art. In this selection process, it is often necessary to select or reject pulses in a pulse train on the basis of pulse width alone, the width of the acceptable pulses being defined and easily varied by an operator. Many patents in the prior art contain schemes which select or reject pulses on the basis of width. To accomplish this pulse width selection, and "pass" the remainder of the original pulse train to another circuit, the prior art primarily makes use of the delay line. The U.S. Pat. Nos. 3,247,491 to Duvall and No. 3,413,000, to Townsend, utilizing delay lines, achieve a selection process on the basis of width, and pass the remaining desired pulses to other circuitry.

The use of delay lines to achieve pulse duration selection or rejection, however, has several disadvantages. Delay lines used in such applications are not easily varied. The limits on the capability of the pulse width selection are established by the value of the delay line or lines used. If the desired limits of the pulse are to be changed, the delay line itself must be changed, or new combinations of delay lines used in order to accommodate the new limits. Additionally, delay lines allow spurious signals to pass through the selection process, and hence, are not fully selective. Additionally, and perhaps most importantly, the use of delay lines distorts the shape of the original pulses in the pulse train so that any pulse which appears at the output is not a facsimile of the input pulse. The width of these pulses appearing at the output is not coincident with the width of the same pulse appearing at the input, and the pulse interval information is destroyed.

In many applications involving the selection or rejection of pulses in a particular pulse train, it is necessary that the actual width of the accepted pulses and the pulse interval information be retained at the output of the selection process. For these applications, the preceding inventions described in the prior art would not be acceptable. The present invention, however, overcomes these defects of the prior art. The present invention selects or rejects the particular pulses in an incoming pulse train on the basis of pulse width or duration alone, and after the selection or rejection process is completed, passes the desired pulses to an output line. The output pulse data retains the original width information of the incoming pulses, as well as the interval between pulses.

The operation of the equipment is independent of pulse width, pulse rate interval, and duty cycle. The amplitude information of the input pulse train, however, is not retained. Thus, the output pulse train is nearly identical to the input, with the exception of amplitude information, and, of course, with the absence of those pulses which are rejected by the device itself from the input pulse train.

In overcoming the disadvantages of the prior art, as previously explained, the present invention can operate in any one of several modes. The unit can operate in an "accept" or "reject" mode, and within those modes, the operator can either utilize a "window," meaning that both minimum and maximum limits are utilized, or an "open end," meaning that only a single limit (either upper or lower) is utilized, allowing all pulses above or below a certain limit value to be passed (or rejected).

SUMMARY OF THE INVENTION

An object of the present invention is to provide a pulse width selector which selects pulses on the basis of pulse duration.

Another object of the present invention is to provide a pulse width selector which can both select and reject pulses in a pseudo-random pulse series.

A further object of the present invention is to provide a pulse width selector which passes an output pulse series which retains the width and interval information of the individual pulses of the incoming pulse series.

A still further object of the present invention is to provide a pulse width selector which is variable in nature, capable of rejecting or accepting a wide range of pulse widths.

With the above objects in mind, the present invention utilizes a storage device and a counting means connected to the storage device. The counting means has the desired numerical pulse duration limits set into the counter, and the counter accumulates the value of the width of successive pulses. A source of clock drive pulses is connected to both the storage device and the counting means and drives both of them simultaneously. A source of input pulses is connected to the storage means and to the counting means. As individual pulses in the input pulse train are shifted into the storage device, the counting means is simultaneously recording the value of the width of the individual input pulses. A detecting means then tests the counting means to detect whether the duration of each input pulse is within the predefined limits. If the pulse is within the predefined limits, the pulse is either eliminated or clocked out to the output line, depending on whether the apparatus is in the accept or reject mode.

More specifically, the storage device comprises two individual storage devices, in this case two shift registers. The desired pulse width limits are then set into the counter by the operator via controls on the device. As each individual pulse is clocked into the first shift register, the counter is simultaneously recording the duration of that individual pulse. As the value of the pulse width exceeds the "minimum" limit, a sensing means is tripped in the counter. If the pulse duration exceeds the "maximum" limit, a similar sensing means will note that condition. When the end-of-pulse signal is received by the counter, the counter will stop. Each sensing device is then tested. If the minimum sensing device has been activated and not the maximum, the particular pulse is within the accepted limits, and if the device is in the accept mode, the pulse is clocked into the second shift register. If both sensing devices are tripped, or if neither is tripped, the particular pulse is eliminated.

In a reject mode, the pulses within the predefined limits are eliminated, and all others accepted. The accepted pulse is then clocked out of the second shift register onto the output line, and the operation is repeated for the next successive pulse in the input pulse train. The result is a selective acceptance of pulses in an original (input) pulse train.

DESCRIPTION OF THE DRAWINGS

FIG. 2 is a diagram of the input logic circuitry;

FIG. 3 is a diagram of the pulse width counting circuitry, and

FIG. 4 is a block diagram of the decision logic circuitry.

DESCRIPTION OF THE PREFERRED EMBODIMENT

Figure 1:
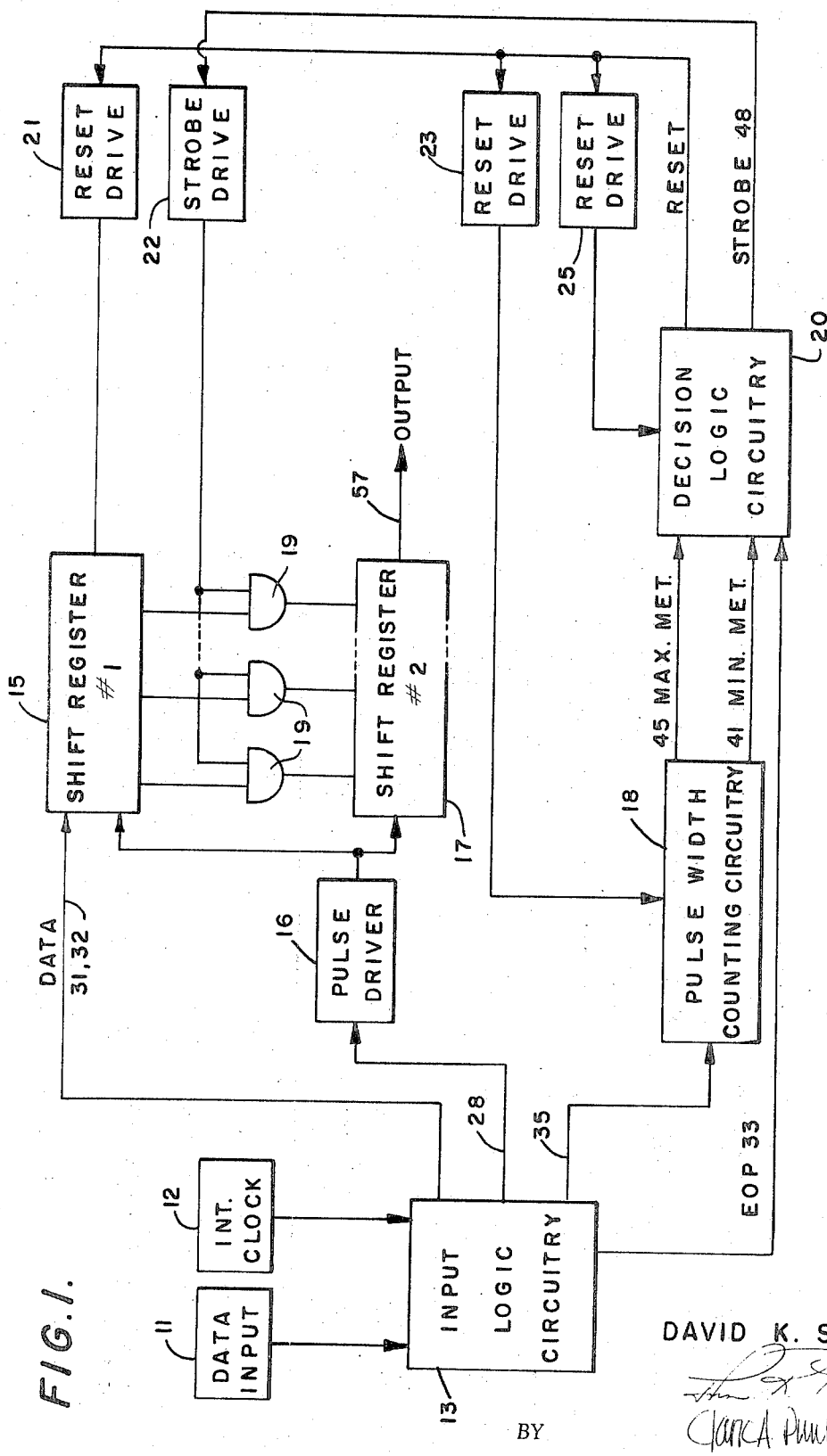
FIG. 1 is a block diagram of the present invention.

In operation, the input pulse train is in the form of pulses of fixed amplitude. The pulses are likely, but not necessarily, of random width, containing a desired or undesired signal of known pulse width. The operator may have a signal of a certain pulse width which he either wishes to accept (and hence to reject all pulses other than pulses of that width) or he may want to merely reject from the pulse train only those pulses of the selected width, while retaining all others. The specified pulse width limits, however, must be known so that it may be established in the counter circuitry of the present invention. The desired limits are established by manipulating standard switching circuitry. If the defined pulses are to be retained, and all others eliminated, the machine is operated in what is known as the accept mode. If the pulses are to be eliminated from the pulse train, and all other pulses retained (such a signal might be a known interference signal) the machine is operated in the reject mode.

Referring to FIG. 1, a block diagram of the present invention is shown. A source of input pulses is shown as data input block 11. An internal source of clock drive pulses is shown as clock block 12. Both input blocks 11 and 12 are connected to input logic block 13 which in turn supplies the data input pulses to a first shift register 15, and supplies clock drive pulses to a pulse driver 16, which in turn drives the first shift register 15 and a second shift register 17. The input logic block 13 is also connected to pulse width counting circuitry in block 18, and additionally provides an end-of-pulse (EOP) signal to a decision logic circuitry block 20. The decision logic block 20 is connected to several drive circuits, including a reset drive 21, a strobe drive 22, a reset drive 23, and a reset drive 25, which drives reset the circuitry of the equipment after the analysis of each individual pulse has been completed. Connecting the first shift register 15 with the second shift register 17 is a series of "and" gates 19—19, which in conjunction with the strobe signal, shifts data from the shift register 15 into the shift register 17.

In operation, the invention may either be driven by a stable, internal frequency source, or an external frequency source. In the preferred embodiment, a stable, internal crystal frequency source 12 of 10 mhz is used, as shown in FIG. 2. An external frequency source may be used to correct time instability errors (e.g., tape recorder wow and flutter). Depending on the mode of operation, the clock signal from the source 12 is controlled by a series of standard "nand" gates and inverters, as shown in FIG. 2. The frequency of the clock signal may be divided down by a counter 26 and multivibrator 27. The clock signal output 28 is then fed to the shift pulse driver 16 (FIG. 1), which drives the shift registers 15 and 17. The shift registers are 100 stages in length, although there is no limitation to the number of stages that may be used in the present invention. The maximum pulse width measured by the invention is determined by the length of the shift registers and the frequency of the clock. The maximum width is that pulse width above which the invention is incapable of accepting or rejecting individual pulses. With 100 stages and a 10mhz clock, the maximum settable width is 19.9 microseconds, with a resolution of 0.2 microseconds. If more stages are used, the maximum settable width increases proportionately. Additionally, if the counter 26 is used to divide the 10mhz signal, the maximum width is increased by a factor of 10, without changing the number of stages, although the resolution is decreased by that same factor.

Referring again to FIG. 2, the input data pulse train appears as an input to a Schmitt trigger 29. The output from the Schmitt trigger then is fed to a series of standard "Nand" gates, as shown in FIG. 2, which result in two data outputs 31 and 32 which provide a signal inversion capability and are connected to the first stage of shift register 15. The data input circuitry provides two additional outputs, as shown in FIG. 2, the end-of-pulse (EOP) signal 33 which is provided as an input to the decision logic circuitry, and counter drive signal 35, which is an input to the pulse width counting circuitry 18 of FIG. 1. As can be seen from FIG. 2, the data input circuitry produces four different outputs: (1) data signals 31 and 32; (2) pulses drive 28; (3) counter drive 35 and (4) EOP signal 33. The data input is typically preceded by a threshold evaluator of the input data train. The input information is thus in the form of pulses of fixed amplitude after the pulse train passes through the threshold unit, the threshold unit being used to screen out spurious signals from the data pulse train. The input pulses thus have at this time lost their amplitude information although they have retained pulse width and pulse position information.

As the train of input pulses clears the data input logic circuitry shown in FIG. 2 (signals 31 and 32), they are clocked into shift register 15 by the clock output 28 and its associated driver circuitry 16. At the same time that the pulse is being clocked into the shift register, the counting circuitry 18 is recording the length of pulse duration. In the preferred embodiment, utilizing a 19.9 microsecond maximum settable width, the counter will record the duration of the pulse in tenths of microseconds. FIG. 3 shows a schematic of the pulse width counting circuit used in the present invention. The standard counting circuit is driven upwards in value by the data logic circuit (counter drive 35) at the same rate that the pulse itself is being clocked into the shift register 15. The counting circuit is a standard, well-known binary counter 38. As the counter is driven upwards in value, the value in the counter is compared by a standard comparator means with the value of the minimum limit established in the machine by the operator. These limits (both minimum and maximum) and the comparison function are accomplished through the use of standard rotary thumbwheel switches such as the EECo SWITCH, manufactured by the Electronic Engineering Company of California. The operator merely has to set his desired limits in the switches by rotating the switch to the appropriate position. The output of the switch will change when the value in the counter exceeds the operator-selected value. In operation, as the value in the counter first passes the minimum limit, in terms of 10ths of microseconds, units of microseconds and 10s of microseconds, this condition is recognized by "Nand" gate 40, shown in FIG. 3. An output 41 of this "Nand" gate is connected to the decision logic circuitry 20 of FIG. 1.

At this point, the counting circuitry has determined that the individual pulse being clocked into the first shift register meets the minimum width limit of the desired pulses to be accepted or rejected. The counter continues to accumulate as the pulse continues to be clocked into the shift register 15. When the value in the counter reaches the maximum value established by the operator in the machine, and the comparator recognizes this fact in terms of 10ths of microseconds, units of microseconds, and 10s of microseconds, appropriate signals are sent to a Nand gate 43. An output 45 of this gate is likewise connected to the decision logic circuitry. The counter continues to accumulate until the end-of-pulse signal provided by the input logic circuitry is recognized by the counter. At this point the counter stops, as does the first shift register.

If the shift register 15 is filled before the EOP signal is recognized, a signal is sent from the counting circuitry 18 via a pulse line 46 to the decision logic circuitry 20. A decision is then made as follows: If there is an upper limit on the width of an acceptable pulse, the portion of the pulse in shift register 15 and the remaining portion of the pulse is eliminated. If there is no upper limit on the acceptable size of the pulse, the data in shift register 15 and the remainder of the pulse is shifted into shift register 17.

Assuming a pulse within the capacity of shift register 15, the entire pulse is now in the first shift register. If the value of the pulse width has exceeded the minimum limit, a pulse has occurred on the output line 41, causing a bistable multivibrator 55 in the decision logic circuitry (FIG. 4) to assume a "set" state. Otherwise, a "reset" state will exist. If the pulse width value has exceeded the maximum limit, a pulse has occurred on the output line 45 and a bistable multivibrator 56 will assume a set state. Otherwise, a reset state will exist for this multivibrator also.

The EOP signal 33 is connected to monostable multivibrators 50 and 52. The EOP signal is passed to the monostable multivibrator 50 when the pulse in the shift register is to be accepted. A pulse is to be accepted in the accept mode when it is greater than the minimum duration limit and less than the maximum. A pulse is to be accepted in the reject mode when it is less than the minimum limit or greater than the maximum.

When either the accept mode with no upper bound or the reject mode with an upper bound is specified, pulses in excess of the shift register capacity may be accepted. In this case, a pulse indicating the shift register is full will occur on pulse line 46 and is passed to the monostable multivibrator 50.

When the end of the pulse is recognized by the input logic circuitry 20, an EOP pulse 33 is generated. This EOP signal is passed to the monostable multivibrator 52 and, if the pulse is to be accepted, to monostable multivibrator 50 as well. The leading edge of the EOP triggers monostable multivibrator 50, producing a pulse on line 48 which strobes the data pulse from the shift register 15 to the shift register 17, via the gates 19—19. The trailing edge of the EOP signal triggers the monostable multivibrator 52, which produces a pulse to drive circuits 21, 23 and 25, which reset the equipment of the invention to its original neutral state. This process is repeated for each pulse in the pulse series. Each pulse is analyzed to determine whether it falls within the specified limits set into the machine by the operator.

At the same time that the rest of the circuitry is being reset, the shift register 17, which contains the binary representation of the pulse to be retained, is shifted to the output line 57 shown in FIG. 1. In the "accept" mode, this process is repeated for each pulse, those pulses appearing on the output line being only those pulses having a width within the limits established by the operator of the machine. If the equipment is operating in the reject mode, however, the process is similar, except that those pulses falling within the specified limits will be cleared out of the first shift register and all other pulses will be strobed into the shift register 17, and then to the output line 57. The resulting output pulse train, in the reject mode, will be identical to the input pulse train, with the exception of those pulses falling within the specified limits.

It should be noted here that the preferred embodiment describes a "window" type selection. It is possible to "turn off" the minimum limit so that the only requirement is that the maximum not be met. Thus, any pulse ranging in width from zero to a certain maximum may be accepted or rejected. It is also possible to "turn off" the maximum so that the only requirement is that a minimum limit be met by the individual pulses.

By the use of this invention, pulses having a certain width or duration may be retained in a pulse train and all other pulses rejected, or certain pulses falling within those limits may be rejected, at the same time retaining all other pulses. Thus the output pulse train will contain only those pulses falling within the limit specified by the machine (accept mode), or will contain all the pulses appearing in the input with the exception of those pulses determined by the limits set into the machine (reject mode). The individual output pulses, when compared with the individual input pulses are identical, within a tolerance of 0.2 microseconds as explained earlier with the exception of the amplitude information of the input pulse, which is not retained by the operation of the present invention.

It is to be understood that the above described embodiment of the invention is merely illustrative of the principles thereof and that numerous modifications and embodiments of the invention may be derived within the spirit and scope thereof, such as extending the length of the shift registers, so as to enlarge the width accepting capability of the equipment.

What is claimed is:

1. An apparatus for accepting or rejecting an input pulse on the basis of its width comprising:
   a source of input pulses;
   first storage means;
   means for clocking an input pulse from said source into said first storage means, the required number of clock pulses being proportional to the width of said input pulse;
   means connected to said clocking means for counting the number of clock pulses required to clock said input pulse into said first storage means, said counting means having predefined numerical limits;
   means connected to said counting means for detecting whether said number of clock pulses falls within said predefined numerical limits, thereby determining whether said input pulse is to be accepted or rejected;
   second storage means; and
   means connected to said detecting means for alternatively clearing a rejected input pulse from said first storage means or transferring an accepted input pulse from said first storage means into said second storage means.

2. An apparatus according to claim 1, wherein the counting means accumulates the required number of clock pulses for successive input pulses, said counting means returning to a reference value after each successive input pulse is processed.

3. An apparatus according to claim 2, wherein the clocking means drives said first and second storage means and said counting means.

4. An apparatus according to claim 3, wherein said counting means includes means for storing operator-settable limits of minimum and maximum required number of clock pulses.

5. An apparatus according to claim 4, wherein said detecting means includes means for recognizing the end of each successive input pulse, said counting means ceasing its operation when said end of pulse is recognized.

6. An apparatus according to claim 4, wherein said detecting means includes means for continuously comparing the number of clock pulses against said minimum and maximum limits already established in said counting means.

7. An apparatus according to claim 4, wherein said counting means includes a binary counter.

8. An apparatus according to claim 7, wherein each stage of said first storage means is connected to the corresponding stage of said second storage means, the information located in said first storage means being shifted in parallel to said second storage means on command of said detecting means, said information retaining the pulse width and pulse interval information of the original input pulse train.

9. An apparatus according to claim 8, which includes means for resetting the first storage means and counting means to b reference value, ready to receive and analyze the next successive pulse in the input pulse train.

* * * * *